Oct. 20, 1931.    H. H. EATON    1,827,740
ARMATURE INSULATION MACHINE
Filed Jan. 2, 1926    10 Sheets-Sheet 2

Inventor
H. H. EATON

By Chester H. Bravel
Attorney

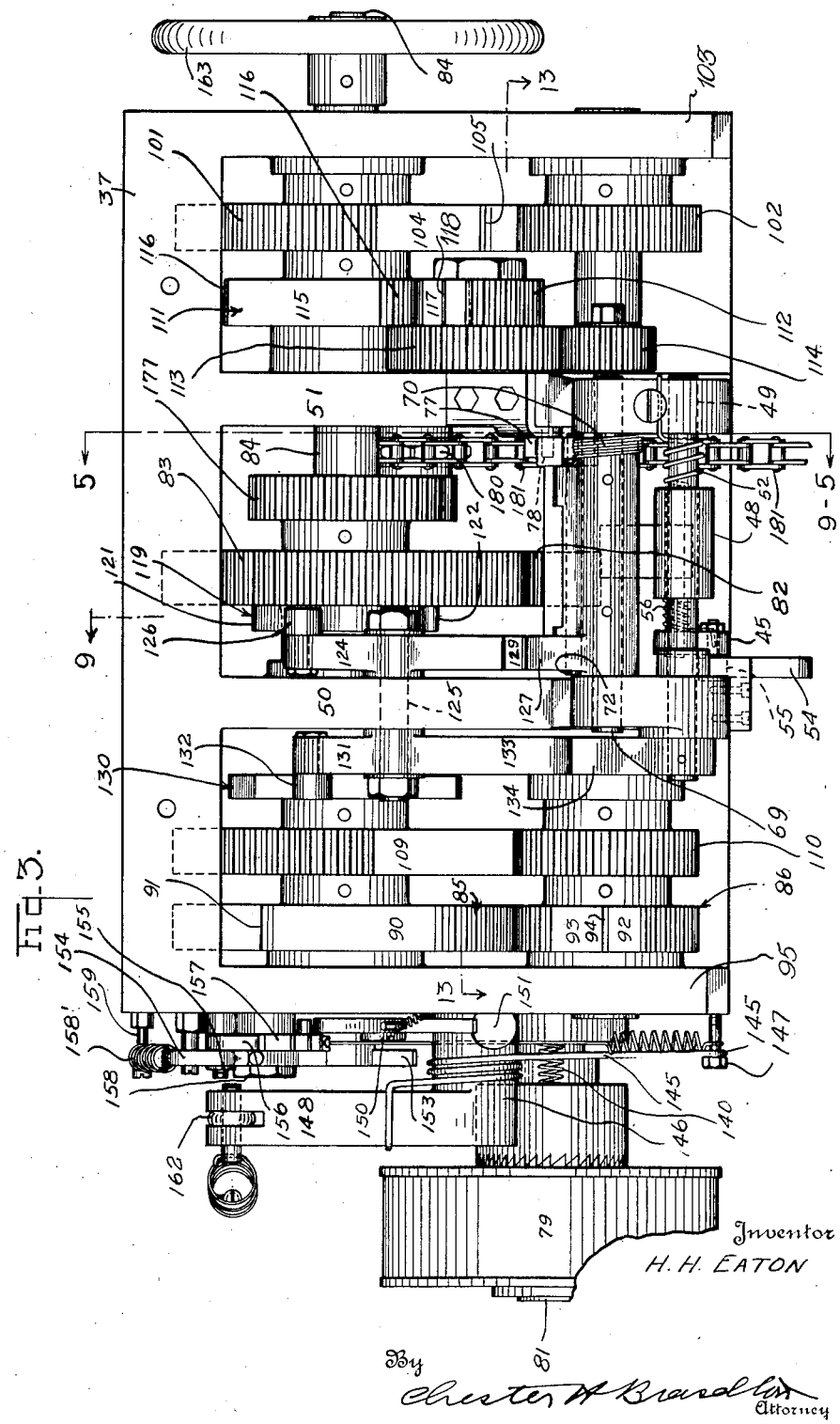

Oct. 20, 1931.  H. H. EATON  1,827,740
ARMATURE INSULATION MACHINE
Filed Jan. 2, 1926   10 Sheets-Sheet 4
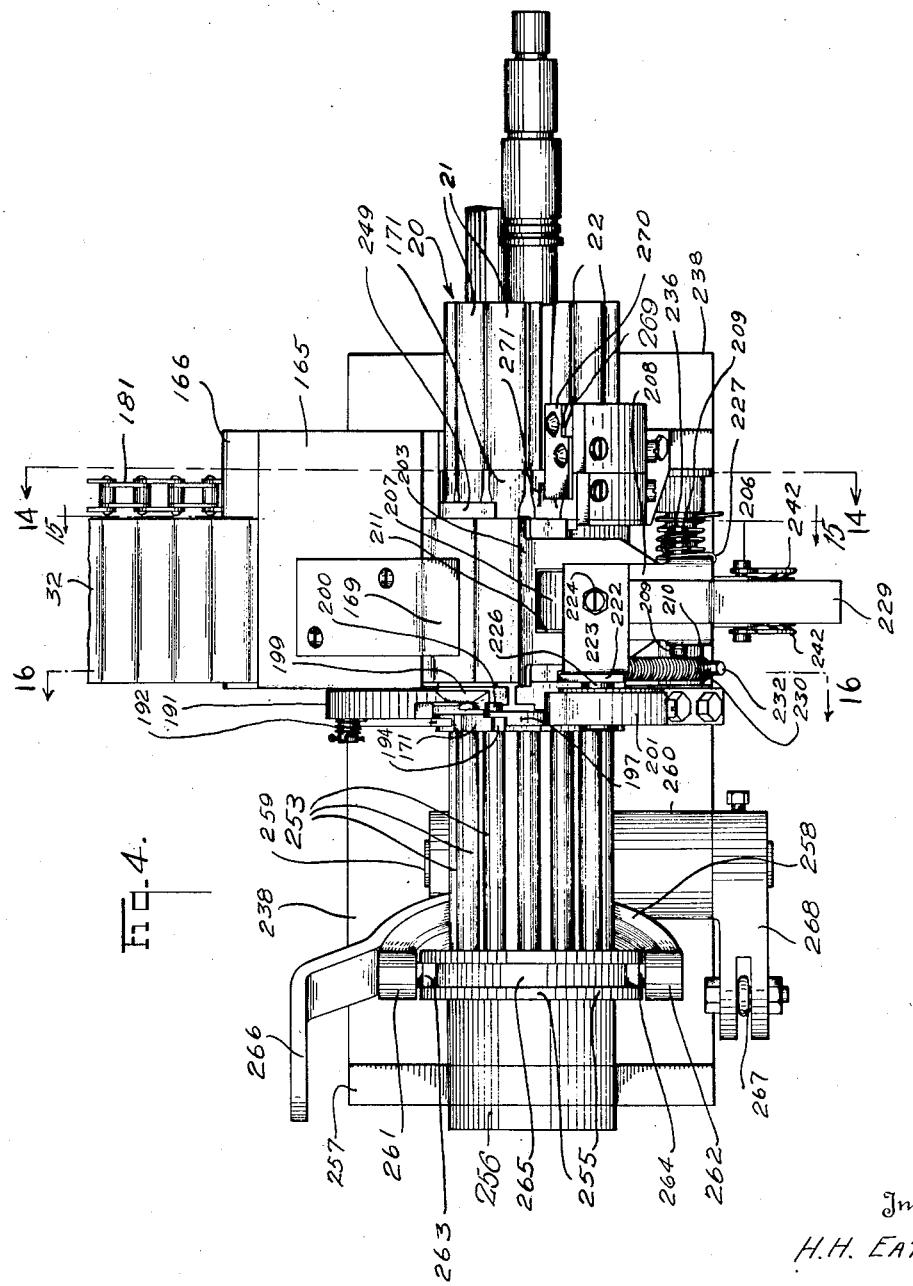
Inventor
H.H. EATON
By Chester H Brazelton
Attorney

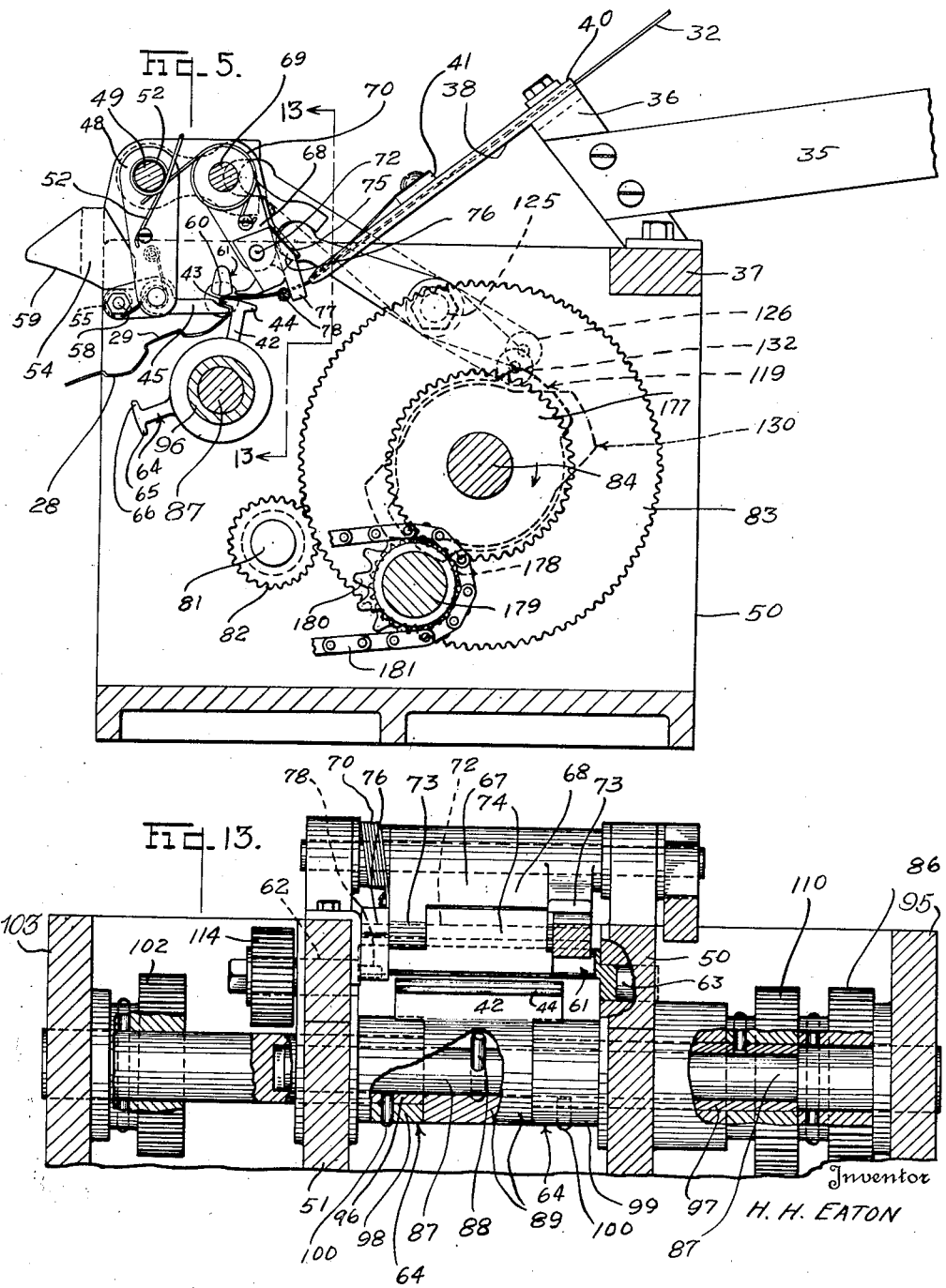

Oct. 20, 1931.     H. H. EATON     1,827,740
ARMATURE INSULATION MACHINE
Filed Jan. 2, 1926     10 Sheets-Sheet 6
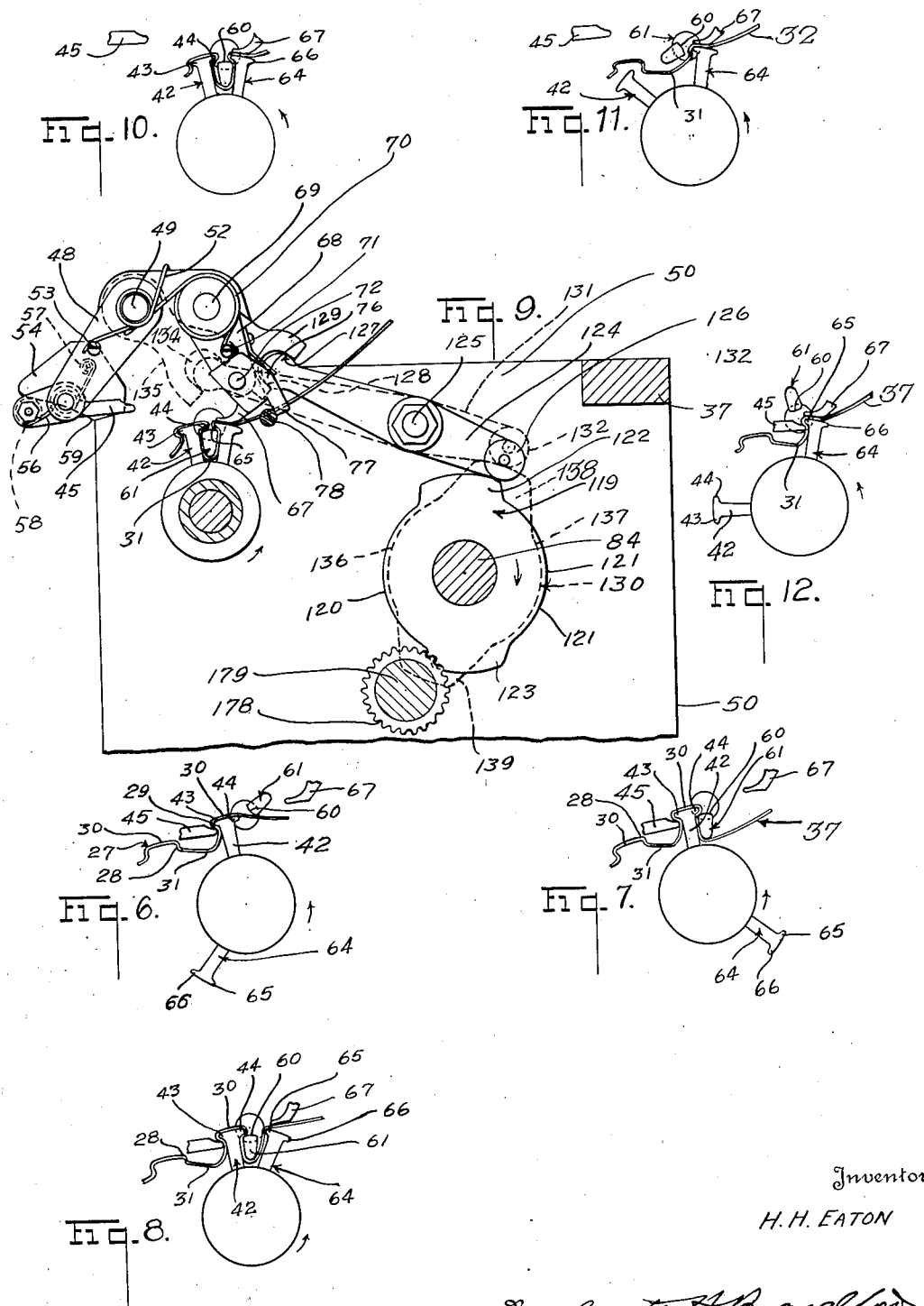
Inventor
H. H. EATON
By Chester H. Braselton
Attorney

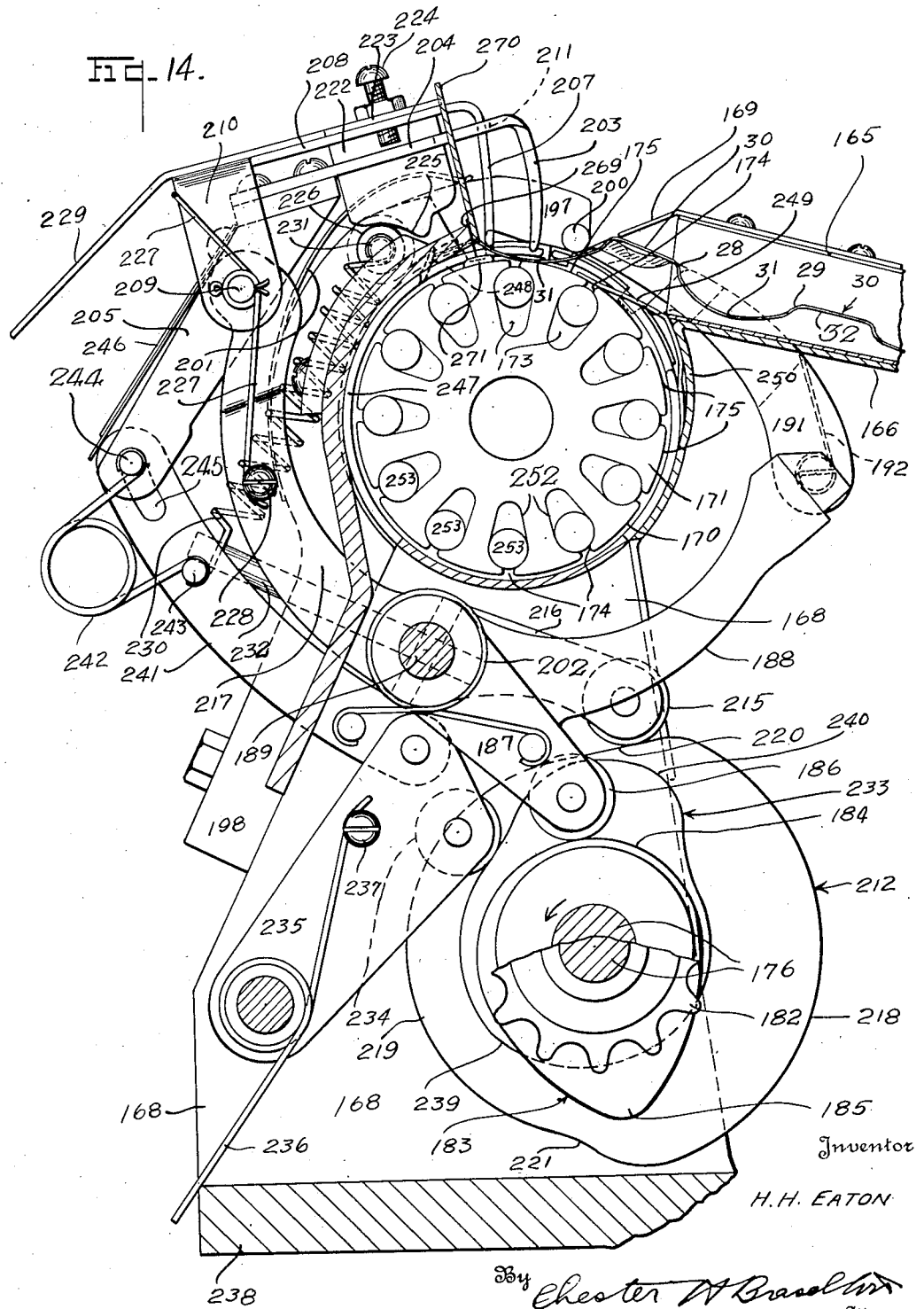

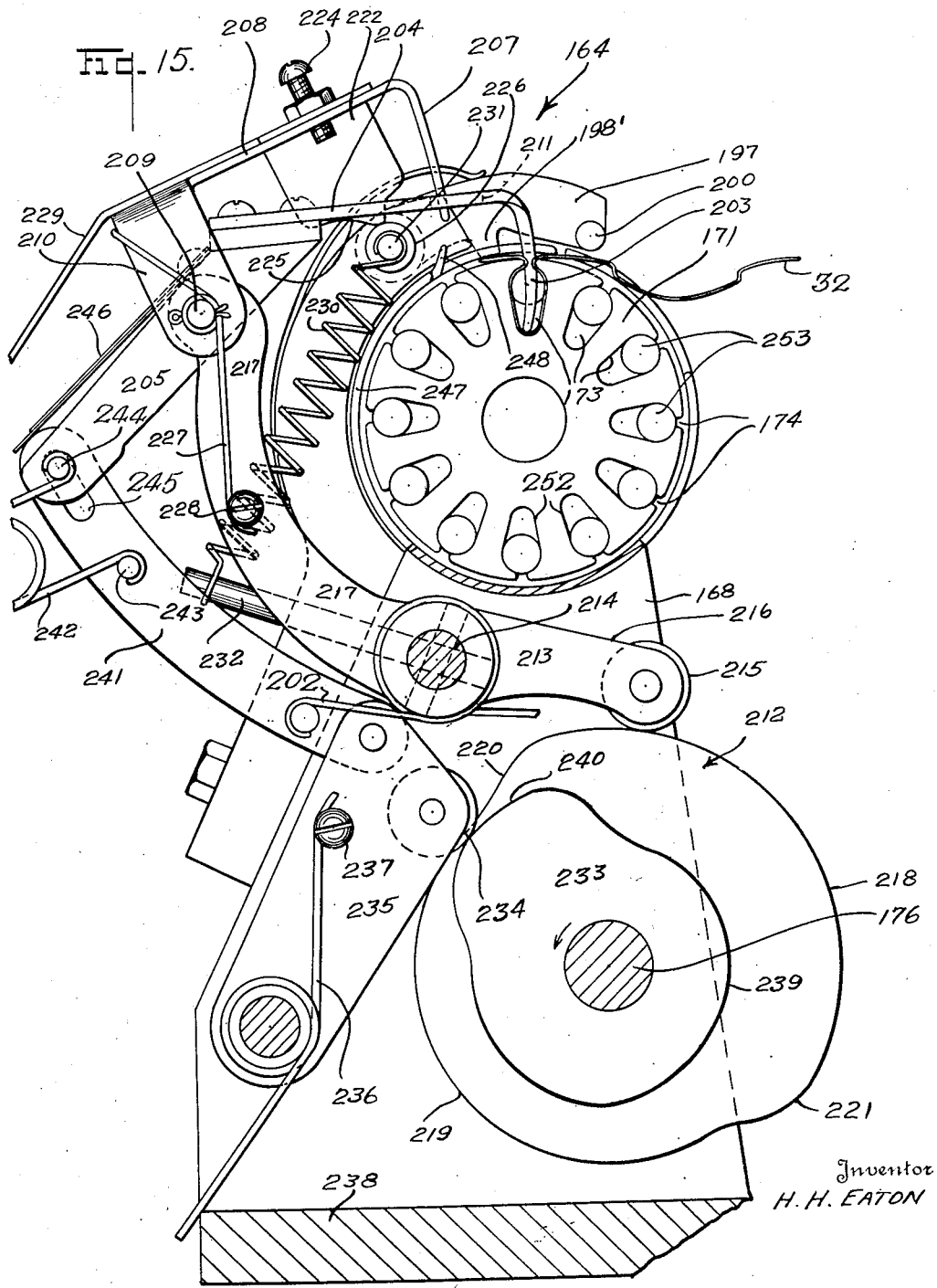

Oct. 20, 1931.  H. H. EATON  1,827,740
ARMATURE INSULATION MACHINE
Filed Jan. 2, 1926  10 Sheets-Sheet 9
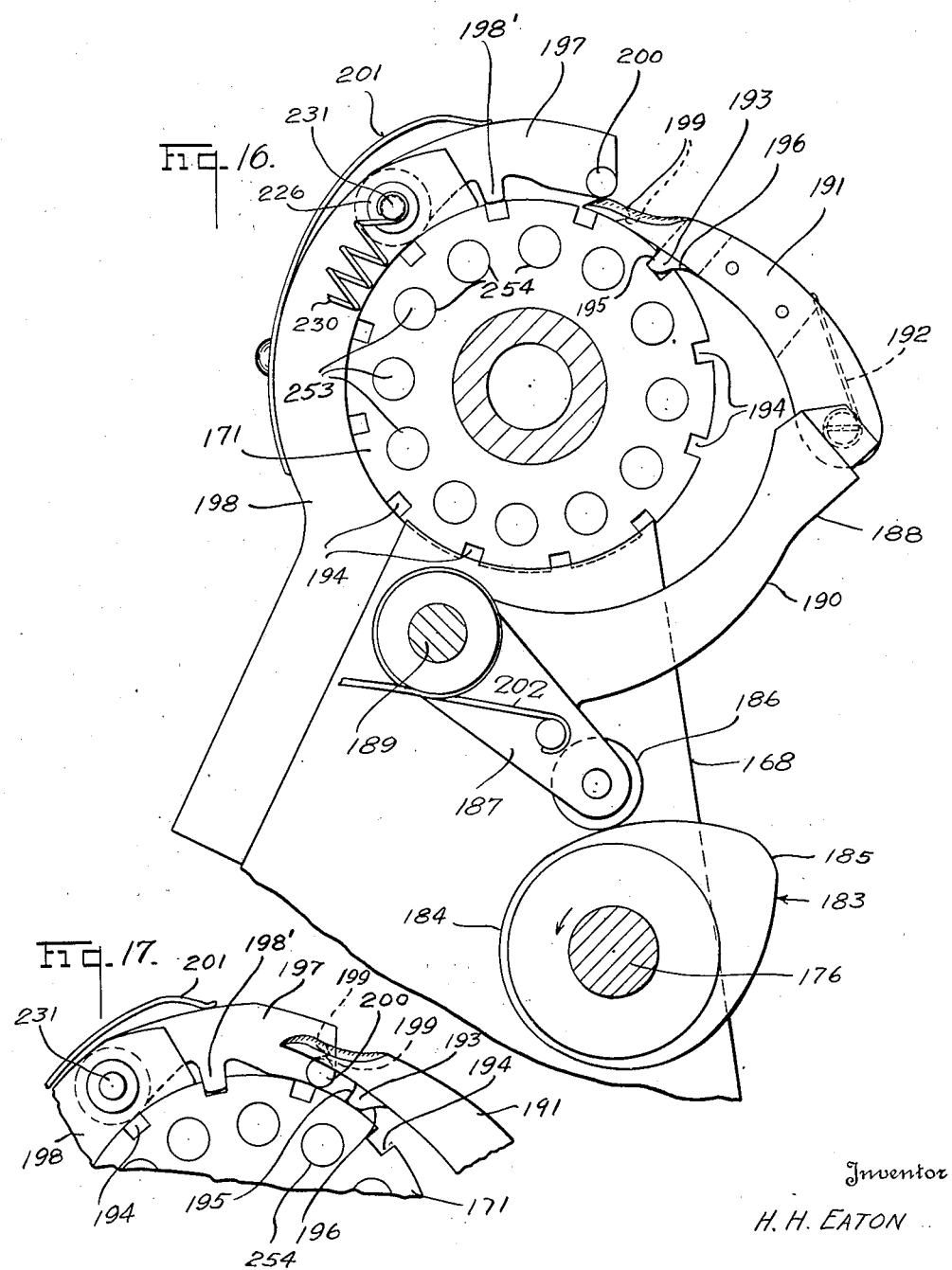
Inventor
H. H. EATON
By Chester H. Brandon
Attorney

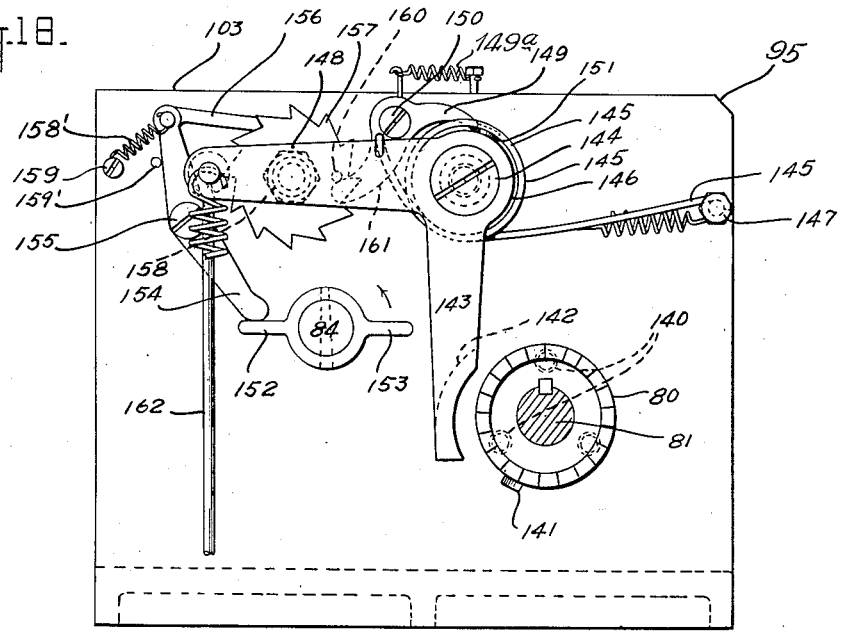
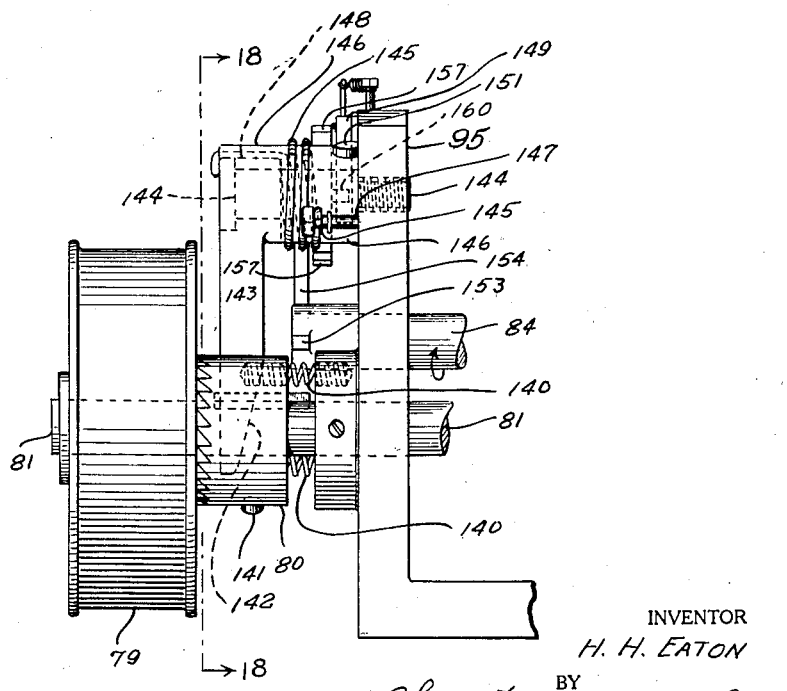

Patented Oct. 20, 1931

1,827,740

UNITED STATES PATENT OFFICE

HARRISON H. EATON, OF TOLEDO, OHIO, ASSIGNOR TO THE ELECTRIC AUTO-LITE COMPANY, OF TOLEDO, OHIO, A CORPORATION OF OHIO

ARMATURE INSULATION MACHINE

Application filed January 2, 1926. Serial No. 79,053.

This invention relates to armature insulations and to an apparatus and method for forming and mounting an insulating strip in the slots of an armature core in which the armature winding wires are received and held.

In the type of armature to which the present invention relates, the armature core of laminated or other suitable structure, is provided with longtiudinal grooves or slots in which the armature windings are wound or inserted. Before winding these winding wires into the slots, an insulating layer or lining is required in each slot to separate the windings from the iron armature core. These insulating linings have heretofore been made of pieces of paper cut to form an individual lining for each slot and pressed or creased to permit them to be inserted into the slots of the core, the edges of the paper linings projecting radially from the edges of the slots. These projecting portions or edges of paper strips were then clamped to the surface of the armature and the winding wires inserted, the clamps acting as guides for the winding wires to be inserted. The strips or pieces of paper cut and formed in this manner did not closely fit the inner surfaces of the slots and, to bring them snugly against the surfaces of the slots, it was necessary to tamp the wires in the slots as they were inserted. The insertion of these separate pieces of insulating paper and the tamping in of the armature winding wires involved considerable labor, thus slowing down the output and adding to the cost of the armature. Moreover, in case any of the pieces of paper happened to slip longitudinally, the stopping of the winding apparatus and replacement of the paper were necessary. Moreover, as the tamping of the winding wires tended to break the insulating paper strips, a strong or "fish" paper was required to minimize the troubles from this source. As the pieces of paper were usually stored after creasing or crimping to be ready for use, the edges of the papers were liable to become frayed or worn from handling before mounting in the armature.

These difficulties and disadvantages are obviated by my present invention, some of the objects of which are: to provide an apparatus in which a strip of paper is creased or crimped to closely fit into the grooves of the armature core and is then slid into position therein; to provide a method and apparatus by which a unitary strip of paper is formed to fit into all or several of the armature core slots and is slipped as a unit into the slots; to provide a method and apparatus in which the insulating paper strip is crimped immediately prior to its insertion into the armature core slots; to provide an apparatus in which in a unitary sequence a strip is formed into the shape required to fit the slots of an armature core and is inserted into the slots; to provide a continuous strip of insulating paper fitting into several slots of an armature; to provide a method of folding and inserting the insulating lining paper that permits a close and accurate fitting of the paper to the inner surfaces of the slots to avoid the necessity of tamping in the winding wires and to permit weaker and cheaper paper to be used and to provide an apparatus in which the folding and fitting in of the insulating paper strips is done substantially automatically and with a minimum of labor.

With these and other objects in view, which will become apparent from the following description, my invention comprises the method and apparatus described and set forth in the following specification and claims.

The various features of the invention are illustrated in the accompanying drawings, in which:

Fig. 3 is a plan view of a paper creasing or crimping mechanism forming a part of the apparatus shown in Figs. 1 and 2, a guiding means for the paper to be creased being omitted to enable the mechanism to be shown more readily;

Fig. 4 is a plan view of a mechanism for sliding or mounting the folded or crimped paper strip in the armature;

Fig. 5 is a vertical sectional view of a portion of the paper crimping mechanism taken on line 5—5 of Fig. 3;

Figs. 6, 7 and 8 are diagrammatic views of certain of the crimping or creasing elements in successive stages or positions of movement in the process of crimping or creasing the paper insulating strip;

Fig. 9 is a cross sectional view of a portion of the paper creasing mechanism taken on line 9—9 of Fig. 3 and showing the paper crimping or creasing elements in the next movement or step in the creasing operations following that of Fig. 8;

Figs. 10, 11 and 12 show the crimping or creasing elements in successive positions following the position of Fig. 9;

Fig. 13 is a vertical sectional view through the paper crimping mechanism, taken on line 13—13 of Fig. 5, portions of the mechanism moreover being broken away to more clearly illustrate the construction of the mechanism;

Fig. 14 is a sectional vertical view taken on line 14—14 of Fig. 4, of the mechanism for mounting the crimped or creased paper strip on the armature;

Fig. 15 is a vertical sectional view taken to the left of the line 15—15 of Fig. 4 of the mechanism for mounting the crimped or creased paper strip on the armature;

Fig. 16 is a vertical sectional view, taken on line 16—16 of Fig. 4, of the mechanism for mounting the crimped paper strip on the armature;

Fig. 17 is a view similar to that of Fig. 16 of a portion of the mechanism in a different position in its cycle of operations.

Fig. 18 is a view of a power disengaging mechanism taken on line 18—18 of Fig. 19; and Fig. 19 is a side view of the same.

In my present invention, a strip of paper is crimped or creased in such a manner that, when it is formed or folded to conform to the contour of the armature core and slid into its proper position in the armature core grooves, the creases in the paper fit the projections or ledges and hollows of the grooves and the paper fits the walls of the grooves so closely as to resist any tendency to fall or work radially outwardly from the grooves. The strip of paper thus crimped or creased, is then brought and held into a shape or form conforming to the contour of the armature core and slots and immediately at the side of the armature to be mounted or lined, the strip making a complete circuit of the armature in alignment with the outer surface of the armature and the inner surfaces of the slots. The strip is then cut at a line to complete the circumference of the armature and is then slipped through suitable guides sidewise onto the armature. When released on the armature core, the folds or creases in the strip fit tightly against retaining ledges in the slots and are firmly held in place in the grooves.

Figure 1:
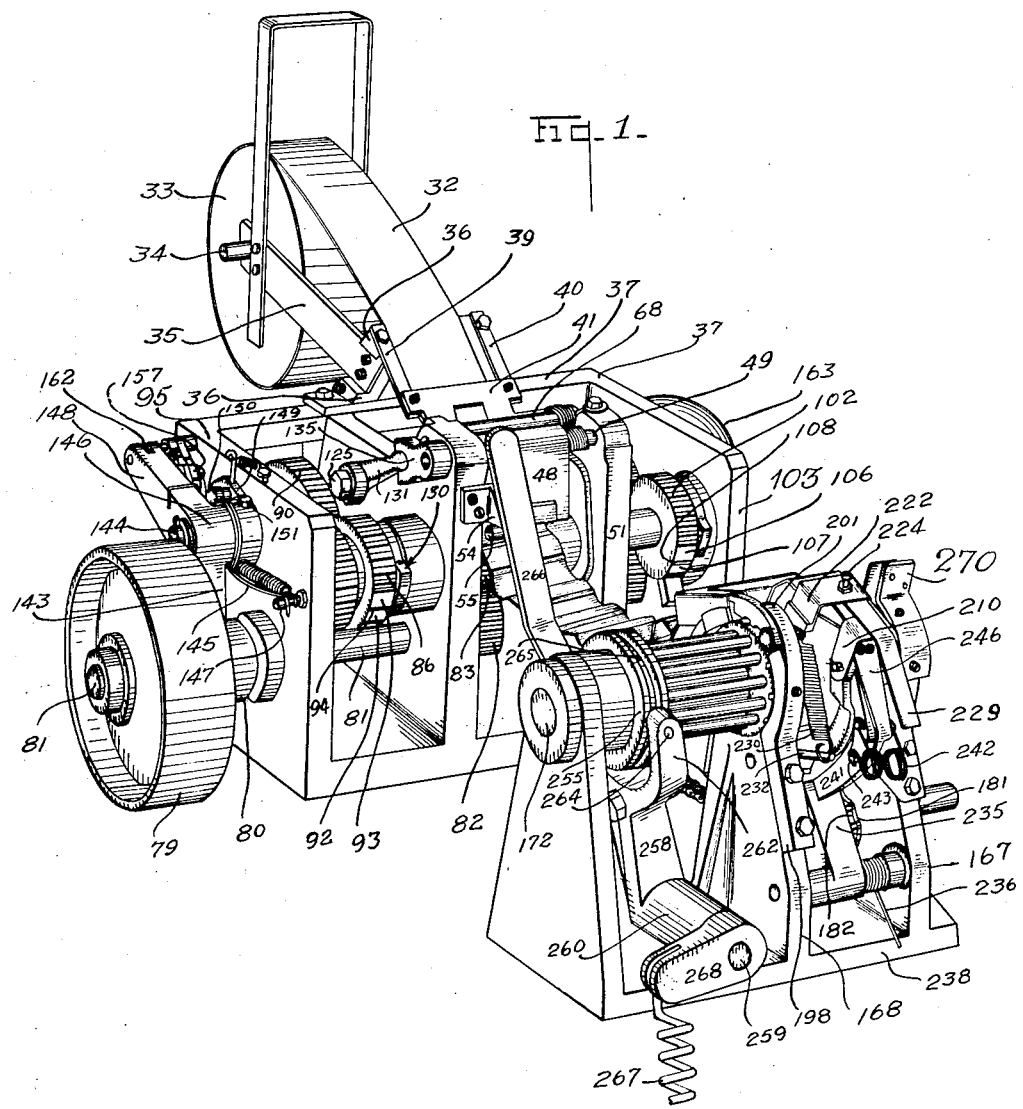
Fig. 1 is a perspective view of an apparatus embodying a preferred form of my invention.
Figure 2:
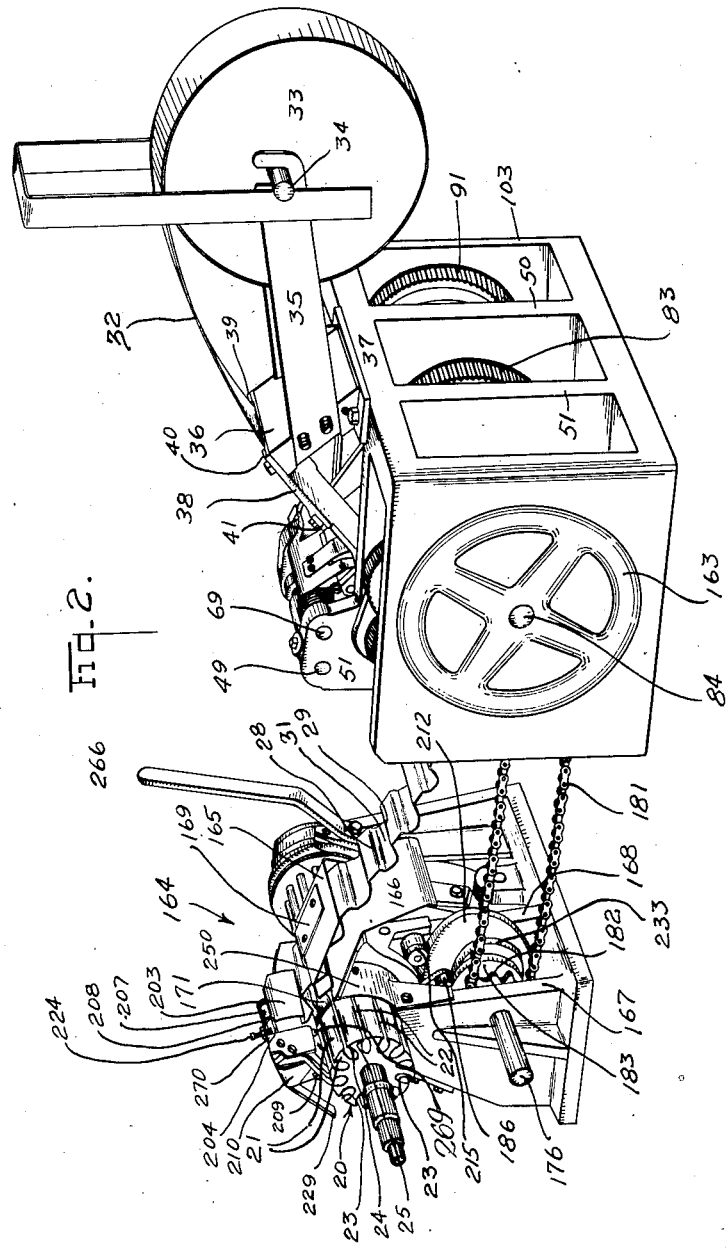
Fig. 2 is a perspective view of the apparatus taken from an opposite corner of the apparatus.

Referring more particularly to the accompanying drawings, the invention is illustrated as applied to an armature core 20, shown in perspective in Fig. 2, having a cylindrical outer surface divided into segments 21 by a series of radial slots 22. The slots 22 are of a general V or oval shape having their outer open ends slightly contracted to a narrow passage 23 by opposing ledges or edges 24 and 25 and giving the separated armature segments 21 a flaring, approximate bell or T shape. In creasing or crimping the strip of insulating paper 32, the strip is given a series of alternately reversed creases 28 and 29, Figs. 1, 2, 5, 14 and 15, spaced alternately at a length 30, equal to the width of the segments 21, and a length 31 equal to the peripheral length of the slots 22, so that when the strip is folded into the proper shape with the lengths 30 covering the segments 21 and the lengths 28 depressed inwardly to conform to the surfaces of the slots 22, the creases 28 and 29 will abut the inner faces of the ledges 24 and 25 and hold the lengths 31 tightly against the inner faces of the slots.

A paper strip 32 to be subjected to the required creasing operations may be supplied from a roll 33 rotatably mounted on a rod 34 supported between arms 35 projecting rearwardly from a supporting bracket 36 on the upper face of a frame 37 of the creasing or crimping mechanism. The strip of paper 32 drawn from the roll 33 passes forwardly and downwardly over a guide plate 38, mounted on the bracket 36, and is held in position by a pair of side guide strips 39 and 40 and passes beneath an upper guide plate 41 mounted on and spanning the strips 39 and 40.

Upon leaving, the lower edge of the guide plate 38 the paper strip passes over the upper edge of a vane 42, the upper edge of which is widened to form sidewise projecting ledges 43 and 44. The strip projecting over the edge of the forward ledge 43 is then folded under this ledge and held in this folded position by the edge of a rearwardly projecting floating lever 45. At the beginning of a cycle of creasing or crimping operations for the formation of a pair of creases 28 and 29, the strip is thus gripped between the edges of the ledge 43 and lever 45 with these elements in the position shown in Fig. 5.

The vane 42 is mounted radially on and keyed to an intermittently rotated shaft 87 by means of a pin 88 and at the beginning of the cycle, the shaft 87 rotates just enough to swing the vane 42 from the position shown in Fig. 5 to the position shown in Fig. 6 and then stops for a sufficient period to permit of a sequence of folding or creasing operations.

The floating lever 45 is pivotally mounted on the lower end of a depending swinging lever 48 keyed to a rock shaft 49 journaled in a pair of spaced walls 50 and 51 of the frame 37 and resiliently pressed rearwardly by means of a spring 52 encircling the shaft 49 and having one end caught over the wall 50 and the other end secured to a pin 53 on the lever arm 48. Through this mounting of the lever 45, the lever arm 48 is permitted to be swung by the movement of the vane 42 against the pressure of the spring 52, the pressure of the spring 52, however, folding the strip 32 tightly around and under the forward edge of the ledge 43 and giving the strip a crease 28. The floating lever 45 is held tightly in position under the ledge 43 by means of a suitably curved guide plate 54 mounted on the forward edge of the wall 50 and projecting forwardly thereof, and by a pin 55 projecting sidewise of the forward end of the lever 45 and riding against the under edge of the guide plate 54. The pin 55 is held tightly and resiliently against the lower edge of the guide plate 54 by means of a coiled spring 56 coiled about the pivot pin of the lever 45 and secured at one end to a pin 57 on the lever 48 and at its other, secured to a pin 58 on the lever 45. During the initial movement of the vane 42 from the position of Fig. 5 to that of Fig. 6, the guide pin 55 rides against a horizontal edge 59 of the guide plate 54 so that it has a horizontal movement of translation. The tension of the spring 52 against which the ledge 43 of the vane 42 acts presses the strip of paper 32 tightly under the ledge 43 and forms a crease or fold 28. When the vane 42 and floating lever 45 have reached the positions shown in Fig. 6, they pause for the operation of other folding mechanisms.

During the movement of the vane 42 from the position shown in Fig. 5 to the position of Fig. 6, the upper edge of the vane 42 passes beneath a flattened edge 60 of a folding bar 61 of substantially the same cross sectional shape and area as the grooves or slots 22, the strip of paper 32 being drawn between the top edge of the vane 42, and the flattened edge 60 of the bar 61. The folding bar 61 is mounted on trunnions 62 and 63, journaled in the walls 50 and 51 in such a manner that it may be swung downwardly about the ledge 44 of the vane 42 to lie against the side of the vane as shown in Fig. 7, this movement being initiated by suitable mechanism during the movement of the vane 42 and being completed while the vane 42 is at rest. Through this movement of the folding bar 61, the strip of paper 32 is wrapped tightly over the upper surface of the vane 42 and pressed under and against the lower surface of the ledge 44 to form a crease 28. (See Figs. 6 and 7.)

During the movement of the vane 42 and the folding bar 61 to the position shown in Fig. 7, a second vane 64 rotatable about the same axis as the vane 42 and having similar ledges 65 and 66 having started from the position occupied by the vane 42, moves through the positions indicated in Figs. 5, 6 and 7, to the position shown in Fig. 8 in which latter position, it tightly wraps the paper strip 32 around the side and rounded walls of the folding bar 61. A slight further movement to the position shown in Fig. 9 serves to complete the wrapping movement and to press the paper strip 32 under the ledge 65 of the vane 64 to initiate the formation of a succeeding crease 29. As the folding bar 61 has the same cross sectional shape and dimensions as the grooves 22, the length of strip between the creases 28 and 29 is equal to the peripheral length of the groove and the length of paper thus folded, when slipped into the grooves will closely fit the surfaces of the groove.

While the vanes 42 and 64 are in the positions shown in Fig. 9, and before the vane 42 starts on a cycle of movements similar to that just described in connection with the vane 64, a shoe 67 is brought downwardly and forwardly onto the strip 32 resting on the outer face of the vane 64 to grip this strip against the outer face of the vane and thus permit the movement of the vane 42 without releasing the strip. The movement of the shoe 67 is a combination of forward and downward movements to bring it to position over the edge of vane 64 at the proper time and to then swing the toe of the shoe downwardly onto the edge of the vane 64.

To provide this movement of the shoe, the shoe 67 is mounted on a leg lever 68 pivoted on a cross shaft 69 extending between the walls 50 and 51 immediately to the rear of the shaft 49 and is resiliently pressed rearwardly by means of a coil spring 70 coiled about the shaft 69 and secured at one end to a pin 71 on the lever 68 and resting at its other end under the shaft 49. The shoe 67 is pivotally mounted on the lower end of the lever 68 by means of an ankle pin or pintle 72 extending horizontally through a pair of spaced ears 73 on the lever 68, and a lug 74 projecting upwardly from the shoe 67. The shoe 67 is held resiliently in position on the lever 68 by means of a leaf spring 75 secured to the rear face of the lever 68 and resting against the rear face of a trip plate 76 rigidily secured to the side of the shoe. As the lever 68 swings forwardly on the shaft 69, the shoe 67 rides integrally therewith until it reaches the position shown in Fig. 5. When this position is reached, however, a downwardly projecting finger 77 on the trip plate 76 comes into contact with a pin 78 projecting sidewise from the wall 51 into the path of the finger. As the further forward movement of the lever 68 and ankle pin 72 carries the upper portion of the shoe 67 forwardly, the shoe tilts about the pin 78 as a fulcrum bending the spring 75 and tilting the toe of the shoe downwardly onto the upper edge of the vane 64, as shown in Fig. 9.

The paper strip 32 is thus held between the toe of the shoe 67 and the upper surface of the vane 64 and the vane 42 may then begin a new cycle of rotations moving first to the position shown in Fig. 10. As soon as the vane 42 has moved out of the path of the folding bar 61, the folding bar begins a new cycle of rotations, the vane 42 and bar 61 moving to and through the positions shown in Fig. 11. As soon as the folding bar 61 has moved out of the path of the floating lever 45, the lever 45 moves rearwardly beneath the ledge 65 of the vane 64, the positions of the lever 45, folding bar 61, shoe 67, and vane 64 then being as shown in Fig. 12. The lever 68 then moves rearwardly, the shoe 67 tilts upwardly on the ankle pin 72 and then swings backwardly, releasing the paper strip 32, which is now held between the ledge 65 and the floating lever 45, and the folding bar 61 continues on its rotational movement until these elements reach the positions shown in Fig. 5, the vane 64 now taking the position taken by vane 42 in Fig. 5, and vane 42 taking that of vane 64. The cycle of operations of the vanes 42 and 64 and the folding bar 61, floating lever 45, and shoe 67 is then repeated as described above, except that the relations of the vanes 42 and 64 are reversed.

It will be noted that for each set of opposed creases 28 and 29 and intermediate fold, a complete cycle of operations of the folding bar 61, floating lever 45 and shoe 67 is required, and that for each cycle of these elements, one or the other of the vanes 42 or 64 makes a complete cycle, but that each vane 42 and 64 makes but one cycle for each two cycles of the bar 61, lever 45 and shoe 67, one vane resting or remaining idle while the other is rotating through its cycle. There is also one cycle of the bar 61, lever 45 and shoe 67 and of one or the other of the vanes 42 or 64 for each slot 22, and accordingly, there will be as many of these cycles for each complete insulation strip as there are slots 22 in the armature. Thus, in the example shown in the drawings, the armature has twelve slots 22, and there must be twelve cycles for the bar 61, lever 45, and shoe 67, and six alternate cycles for each of the vanes 42 and 64.

These elements are driven through their respective cycles from a common source of power transmitted through a pulley 79, and through any suitable power transmitting means that will give the various elements their proper timed movements. From the pulley 79 the power is transmitted through a saw tooth clutch 80 to a shaft 81 and through a gear pinion 82 keyed onto the shaft 81 to a gear wheel 83 meshing with the pinion 82 and keyed onto a main driving shaft 84 from which the various elements of the paper crimping or creasing mechanism are driven. The gears 82 and 83 may have any desired or suitable gear ratio, the ratio in the present instance being 1 to 3, so that the shaft 81 rotates three times as fast as the main drive shaft 84.

To drive the forming vane 42 from the drive shaft 84, the movement of the shaft 84 is transmitted through an intermittent gear mechanism comprising a gear 85 keyed onto the shaft 84 and meshing with a gear 86 keyed onto a shaft 87 on which the vane 42 is also rigidly mounted by means of a pin 88 passing through the shaft 87, and through a collar 89 integral with the vane 42 and mounted on the shaft 87. The gear 85 is twice the diameter of the gear 86 and is provided with gear teeth to mesh with those of gear 86 throughout a little less than half of its circumference, or just sufficient to turn the vane 42 in a continuous movement from the position it occupies in Fig. 6 to its position in Fig. 5. The remaining portion 90, slightly over half of the circumference of the gear 85, is bare of teeth except for a tooth 91, at the proper interval, sufficient to rotate the vane 42 from its position in Fig. 5 to its position in Fig. 6, the total number of teeth covering substantially half of the circumference of the gear 85 and being sufficient in the successive meshings with the gear 86 to give the shaft 87 and vane 42 a complete rotation for each rotation of the shaft 84. The shaft 87 and vane 42 will, however, remain substantially stationary throughout approximately one half rotation of the shaft 84. To insure that the gear 86 will be held in position while the bare or toothless portions 90 of the gear 85 is rotating in contact therewith, the gear 86 is provided with a pair of concaved portions 92 and 93 to receive the portion 90 of gear 85 and with a recess 94 to receive and mesh with the tooth 91.

The shaft 87 may be rotatably journaled in the frame of the mechanism in any suitable manner. In the present embodiment of the invention, it is journaled at one end in a bearing in an outer wall 95 of the frame of the mechanism, and at its mid portion and its other end is journaled in sleeves 97 and 96, respectively, which are, in turn, journaled in the frame walls 50 and 51 and 103, and on which the vane 64 is rigidly mounted by means of a pair of collars 98 and 99 integral with the vane 64 and pinned by pins 100 to the sleeves 96 and 97, respectively. Through this mounting, the sleeves 96 and 97 are rigidly connected in a unitary structure with the vane 64, and the vanes 42 and 64 are independently rotatable to follow each other in their cycles as described above.

To avoid any twisting stresses on the vane 64, the sleeves 96 and 97 are driven by suitable gearing from the main drive shaft 84 at synchronized and equal speeds so that the collars 98 and 99 are rotated uniformly and simultaneously throughout their cycles. To this end the sleeve 96 is driven from the shaft 84 through an intermittent gearing comprising a gear 101 keyed on the shaft 84 and meshing with a gear 102, of one half the diameter of gear 101, keyed onto a portion of the sleeve 96 extending between the wall 51 and the outer wall 103 in which the end of the sleeve 96 is journaled. The gear 101 is provided with a toothless portion 104 having a single tooth 105 similar to those of the gear 85 and the gear 102 is provided with concave projecting portions 106 and 107 and recess 108 in Fig. 1, similar to those of gear 86 but the position of the gear 101 on the shaft 84 is different from that of gear 85 on this shaft, the toothless portion of one of the gears being in axial alignment with the toothed portion of the other, so that the successive movements illustrated in Figs. 5 to 12 are obtained.

The sleeve 97 is similarly driven from the shaft 84 by means of intermeshing gears 109 and 110 similar to gears 101 and 102, respectively, and having identical positions on their respective shafts.

The folding bar 61 is also driven from the main drive shaft 84 in such a manner as to remain stationary in the position shown in Figs. 7, 8, 9 and 10, while the vanes 42 and 64 are passing through the movements shown in these figures, and to rotate throughout a complete revolution while the vanes 42 and 64 are passing through the movements shown in Figs. 11, 12, 5 and 6. The folding bar 61 is accordingly driven through two complete cycles during each revolution of the drive shaft 84. To this end the rotation of the drive shaft 84 is transmitted through an intermittent gearing, comprising a gear 111 keyed on shaft 84 and meshing with an intermediate gear 112, which is rigidly secured to and rotatable with a second intermediate gear 113 which, in turn, meshes with a gear 114 keyed to the trunnion 62 carrying the bar 61. The gear 111 is provided with two diametrically opposite toothless portions 115 and two toothed portions 116 and gear 112 is provided with a pair of concave projecting portions 117 adapted to rest against the toothless portions 115 of gear 111, and with a pair of diametrically opposite toothed portions 118 adapted to mesh with the toothed portions 116 of gear 111. The gear 112, and with it the gear 113, is given two half rotations, separated by periods of rest, for each complete rotation of the shaft 84 and gear 111. The gear ratio of the gears 113 and 114 is two to one so that for each half rotation of the gears 111, 112 and 113, the gear 114, trunnion 62 and folding bar 61 are given a complete rotation. There is thus two complete rotations of the bar 61 for each rotation of the shaft 84, and for each rotation of the vanes 42 and 64, the bar 61, however, rotating through a cycle first with one vane 42 and then with the other 64, as previously described.

The leg lever 68 of the shoe 67 is also given two reciprocations for each rotation of the shaft 84 through a cam and lever mechanism driven directly from the shaft 84. For this purpose, a cam 119 is rigidly mounted on the shaft and is formed with a pair of circular peripheral portions 120 and 121 and with a pair of diametrically opposed portions 122 and 123 projecting radially outwardly from the circular portions 120 and 121. Movement is transmitted from the surface of the cam 119 by means of a lever 124 pivoted on a pin 125 extending sidewise from the wall 50 and having a roller 126 on one end riding on the surface of the cam 119 and its other end projecting into a recess or socket 127 formed between a pair of prongs 128 and 129 projecting downwardly and rearwardly from the leg lever 68.

The follower roller 126 is pressed against the surface of the cam 119 by the action of the spring 70 which presses the lever 68 and forward end of the lever 124 rearwardly and thus tilts or holds the lower end of the lever 124 and the roller 126 tightly against the surface of the cam. When the roller 126 rides against the surfaces 120 or 121 of the cam 119, the forward end of the lever 124 remains tilted upwardly, holding the lever 68 and shoe 67 swung upwardly and backwardly out of contact with the paper strip 32. However, when either of the projecting cam portions 122 or 123 comes beneath the roller 126, the roller is lifted, the forward end of the lever 124, and with it the lever 68, is tilted forwardly and downwardly, carrying the shoe forwardly and downwardly and causing it to tilt to press the paper strip 32 against the upper edge of the vane 42 or 64, as described above, in connection with the movements shown in Figs. 5 to 12. It is to be noted that there are two cam projections 122 and 123, so that for each revolution of the shaft 84 there are two tilting movements of the lever 68 and thus there are two movements of the shoe 67 for each rotation of the vanes 42 or 64, or one movement for each rotation of each vane. There will, accordingly, be one movement of the shoe 67 for each rotation of the folding bar 61.

The lever 48 and floating lever 45 are swung back and forth by means of a cam 130 mounted on the drive shaft 84 and of a similar shape to that of cam 119 but mounted in a slightly different angular position on the shaft 84, and on the opposite side of the wall 50. Movement is transmitted from the surface of the cam 130 to the lever 48 by means of a lever 131 pivoted to an extension of the pin 125 on the opposite side of the wall 50 and having a follower roller 132 riding against the surface of the cam 130, and a forward projecting arm 133 meshing into a socket 134 on the lower end of a lever 135 keyed to the rock shaft 49 on which the lever 48 is also keyed. The cam 130 is provided with a pair of diametrically opposed circular peripheral surfaces 136 and 137 and a pair of diametrically opposed projections 138 and 139 against which the roller 132 is pressed by the action of the spring 52 acting to tilt the lever arms 135 and 133 rearwardly and upwardly and to thereby press the lower arm of lever 131 and the roller 132 downwardly onto the cam surface. When the roller 132 rides against either of the circular surfaces 136 or 137, the spring 52 is permitted to press the lever 48 rearwardly and carry the end of the floating lever 45 tightly against the vane 42 or 64, the spring 52, however, permitting the lever 45 and lever 48 to be pressed forwardly by the vanes 42 and 64, as this merely tends to lift the roller 132 from the surface 136 or 137. However, when the roller 132 rides over either of the cam projections 138 or 139, the roller 132 is lifted, the forward arm 133 and lever arms 135 and 48 are swung forwardly carrying the floating lever 45 forwardly out of its position of engagement with the vane 42 or vane 64.

It is to be noted that the cam 130 has two opposite projections 138 and 139, and that there will be two tiltings of the levers 131, 135 and 48 for each rotation of the drive shaft 84 and for each rotation of each vane 42 or 64. Accordingly, there will be one tilting of levers 131, 135 and 48 for each tilting of levers 68 and 124, and for each rotation of the folding bar 61 and an alternate movement of the levers 131, 135 and 48 for each rotation of each vane 42 and 64, as described in connection with the movements shown in Figs. 5 to 12.

When the shaft 84 has made six revolutions and has caused each vane 42 and 64 to each rotate six times or a total of twelve rotations for the two vanes, and the folding bar 61 has also made twelve rotations, the strip of paper 32 has been advanced a length sufficient to line all of the twelve grooves 22 of the armature and has been provided with twelve pair of creases 28 and 29 or one pair for each slot 22. The creasing mechanism is then stopped until the strip of paper thus advanced and creased is severed and folded and inserted into the armature slots. This stopping of the creasing mechanism at the proper time interval may be accomplished in any suitable manner, but preferably by disengaging the saw tooth clutch 80 from the pulley 79 and disconnecting the shaft 81 and accordingly the main drive shaft 84 from the source of power.

To this end the clutch 80 is slidably mounted on the shaft 81 and is normally resiliently pressed into engagement with the pulley 79 by means of springs 140 but may be slid on the shaft 81 against the pressure of the springs 140 out of engagement with the pulley 79. For the purpose of disengaging the clutch 80, the clutch is provided with a pin 141 projecting radially outwardly in position to engage a cam surface 142 of a lever 143 depending downwardly from a supporting pivot 144 on the wall 95. The lever 143 is pressed towards the surface of the saw tooth clutch 80 by means of a coil spring 145 coiled about a hub 146 of the lever 143 and anchored at one end to a bolt 147 on the wall 95, and at its other end looped over a lever arm 148, integral with the lever arm 143 and extending from the hub 146 at right angles to the arm 143. During the rotation of the drive shaft 84 and the movement of the various elements of the paper creasing mechanism, the lever 143 is held away from the clutch 80, and out of the path of the pin 141, by means of a pawl 149 pivoted at 150 to the wall 95 and engaging the side of a pin 151 on the hub 146. When the shaft 84 has completed a cycle of six revolutions and the paper strip 32 has accordingly received twelve pairs of creases 28 and 29, the pawl 149 is lifted out of its holding position against the pin 151, thereby releasing the latter and permitting the spring 145 to swing the lever arm 143 downwardly into the path of the pin 141. As the clutch 80 turns, the pin 141 rides against the cam surface 142 of the lever and is forced away from the pulley 79, and the clutch is disengaged.

Any suitable mechanism may be used to lift the pawl 149, or equivalent device, upon the completion of the required number of cycles of the creasing mechanism. In the preferred embodiment shown in the drawings, the disengaging mechanism is driven from the main drive shaft 84 by means of a pair of arms 152 and 153 rigidly mounted on the shaft 84 and projecting radially therefrom in diametrically opposite positions to strike the lower end of and tilt, a pawl lever 154 pivoted at 155 to the wall 95. The tilting movement thus imparted to the lever 154 is transmitted through a pawl 156, secured to the upper arm of the lever, to a ratchet wheel 157 rotatably mounted on a stub shaft 158 projecting from the wall 95. The tilting of the lever 154 by the arm 152 in this manner thus pushes a tooth of the ratchet a distance equal to one tooth and as, in the present instance, the ratchet has twelve teeth, the wheel is given one-twelfth of a rotation. When the arm 152 clears the end of the lever 154 the lever is drawn back to engaging position by means of a spring 158' secured between the upper end of the lever 154 and a pin 159 on the wall 95; a stop 159' serves to limit the movement of the lever so that it is ready to be given a subsequent movement by the arm 153 and to again advance the ratchet wheel 157 one-twelfth of a rotation. When the ratchet wheel has thus been given twelve successive movements by six rotations of the shaft 84, and has completed a complete revolution, a pin 160 projecting sidewise from the ratchet wheel engages and displaces a downward projection 161 of the pawl 149, thus lifting the pawl 149 and releasing the lever 143 to disengage the clutch 80 and stop the mechanism. The pawl 149 is urged against the lever 143 by a spring 149ª suitably connected between the pawl and the wall 95.

When the paper creasing mechanism is to be started to crease a succeeding length of paper strip, the arm 148 is lifted by means of a link 162 of a foot treadle, thus swinging the lever 143 away from the pin 141 and permitting the pawl 149 to drop into position to engage the pin 151 and thus hold the lever 143 away from the clutch 80. While the clutch 80 is released, the shaft 84 may be rotated by means of a hand wheel 163 keyed thereon, for the purpose of adjusting the position of the mechanism.

The strip of paper 32, creased in the above described manner, is delivered to a mechanism 164 for folding the strip to a form to correspond with the armature core to be lined and for then mounting the strip on the armature. The strip 32 is received between a pair of vertically spaced horizontal guide plates 165 and 166 mounted on and between a pair of standards 167 and 168 of the mounting mechanism 164 and is directed by a plate 169 extending downwardly and forwardly of the upper plate 165 towards a mounting drum 171, rotatably mounted on a shaft 172 journaled in the standards 167 and 168.

The mounting drum 171 is of the same diameter and approximately the same shape as the armature core 20 to be lined, being provided with the same number of grooves 173, twelve in the present instance, but the openings 174 in these grooves being somewhat narrower than the passages 23 of the grooves 22 of the armature 20 to permit the paper strip to be more easily inserted therethrough. The cylindrical surface 170 of the drum is divided by the openings 174 into sections 175 of the same width as sections 21 of the armature core and as the lengths 30 of the strip 32.

In mounting the paper strip 32, it is conveyed into such a position that a length 30 of the strip rests on and coincides with a section 175 of the drum 171, and with a crease 28 at the edge of the opening 174 to the rear of the supporting section 175. The supported length 30 is then held on the section 175 and the following length 31 is pushed downwardly through the opening 174 into the groove 173. The drum 171 is then given one-twelfth of a rotation, while a succeeding length 30 is brought into position on a succeeding section 175 of the drum and is then brought to rest to permit the succeeding sections 30 and 31 to be respectively held and depressed. When each of the grooves 173 of the forming drum 171 has been lined with a length 31 of the paper strip 32, the further feeding of the strip stops and the mounted length of strip is severed and pushed sidewise through suitable guides onto an armature aligned with the drum 171.

The various elements of the forming and mounting mechanism 164 are driven from a common or main drive shaft 176 journaled in and extending between the standards 167 and 168. As the shaft 176 and its associated mechanisms are driven in synchronism with the creasing mechanism, it is preferably driven from the drive shaft 84 of the creasing mechanism. For this purpose a gear wheel 177 is keyed onto the shaft 84 and meshes with a gear 178 on a shaft 179 extending from the wall 51 and rigidly connected with a sprocket wheel 180 from which power is transmitted through a sprocket chain 181 to a sprocket wheel 182 keyed to the drive shaft 176. As the various elements of the forming and mounting mechanism 164 are rotated once for each pair of creases 28 and 29, the shaft 176 must be rotated twice as fast as the drive shaft 84. This is accomplished in the present instance by making the gear ratio of the gears 177 and 178 two to one.

A suitable intermittent or step like movement is imparted to the drum 171 from a cam 183 keyed on the shaft 176 and having a circular cam surface 184 throughout a large portion of its periphery, and having a pointed or projecting portion 185 extending through a short portion of its periphery. Movement is transmitted from the surface of the cam 183 directly to a roller 186 mounted on an arm 187 of a bell crank lever 188 pivoted on a fixed shaft 189 extending between and supported by the standards 167 and 168. While the roller 186 rides on the circular portion 184 of the cam 183, the arm 187 remains in a lowered position shown in Fig. 14. When the projecting portion 185 comes beneath the roller 186 however, it lifts the arm 187, rotating it about the shaft 189 and swings a lever arm 190 integrally mounted on the lever 188 upwardly towards the drum. This swinging movement of the arm 190 is transmitted to the drum 171 through a pawl 191 pivoted on the upper end of the arm 190 and pressed downwardly onto the drum by means of a spring 192 and having a downwardly projecting lug 193 that drops into one of a series of notches 194 spaced about the periphery of one edge of the drum. The lug 193 is provided at its forward edge with a square face 195 to engage the notches 194, but its rear edge 196 is inclined so that when the pawl is drawn backwardly it slips out of the notch. The number of notches 194 is the same as the number of grooves 173, being twelve in the present instance.

To prevent the roller 186 from being drawn back by the lug 193 as the pawl 191 is drawn away from the drum, a retaining dog 197 is pivoted on a bracket 198 on the standard 168 and is provided with a square lug 198' adapted to drop into one of the notches 194 when it comes beneath the lug. To permit the drum to be rotated at the proper interval, the dog 197 is lifted at the start of the movement until the lug 198' clears the notch 194 by means of a sidewise projecting lug 199 on the forward end of the pawl 191 which has an upper cam surface adapted to slip under a sidewise projecting roller 200 on the free end of the dog 197, as indicated in Fig. 16. The length of the cam shaped lug 199 is such that as soon as the notch 194 has passed from under the lug 198', the dog 197 is permitted to drop and rides on the circular face of the circular periphery of the drum 171 until a succeeding notch 194 comes beneath the lug 198', whereupon the dog is forced downwardly by a leaf spring 201 fixed on the bracket 198 and bearing against the upper surface of the dog 197. The movement of the pawl 191 is such that it comes to rest as the notch 194 reaches a position beneath the lug 198'. The under face of the lug 199 is inclined downwardly and forwardly so that as the pawl 191 is drawn back, the lug rides over the roller 200 and thus permits the lug 198' to remain in its notch 194 until the pawl 191 begins another forward movement. The lever arm 187 and roller 186 are pressed resiliently onto the cam 183 by means of a suitable spring 202.

The portion 31 of the paper strip 27 is tucked into its proper groove 173 by means of a finger 203 depending from a plate 204 secured to a lever 205 fulcrumed on a floating or reciprocating pivot 209. As soon as the finger 203 has withdrawn from the groove 173, a second finger 207 depending from a plate 208, also pivoted on the floating or reciprocating pivot pin 209 by means of a pair of depending ears or lugs 210, is moved downwardly and rearwardly over the following length 30, spreading this length over the following drum section 175, and slightly entering the succeeding opening 174 to press the succeeding crease 28 in its place therein to be ready for a following tucking operation. The finger 207 is withdrawn just before the lowering of the finger 203 and remains withdrawn until the drum 171 is again rotated one-twelfth of a revolution. The plate 204 is provided with an opening or slot 211 through which the finger 207 projects, and which is large enough to permit the movements of the finger 207 to take place without hindrance.

The properly timed movement is given to the floating pivot pin 209 by means of a cam 212 keyed on the shaft 176 and actuating a lever 213 pivoted at 214 and having a roller 215 carried by one arm 216 riding on the cam 212 and carrying on its upper arm 217 the pivot pin 209. The cam 212 has a circular cam surface 219 of smaller diameter and a circular cam surface 218 of larger diameter joined to the surface 219 by reversely inclined connecting surfaces 220 and 221. The connecting surface 220 leading from the larger circular surface 218 to the smaller circular surface coincides radially with the decreasing edge of the cam 183 so that the pivot pin 209 is swung towards the drum 171 at the same time that the pawl 191 is moved away therefrom. The pivot pin 209 is moved away from the drum 171 at approximately the opposite side of the cam 183. The swinging of the pivot pin 209 provides the proper or required transverse movement of the finger 207 over the surface of the drum 171.

The depressing or radial movement of the finger 207 is provided by means of a lug or ear 222, which extends downwardly over one edge of the plate 208 from a plate 223 secured by means of a screw 224 to the top of plate 208 and which has a lower curved or cam-shaped edge 225 riding on a cam roller 226 projecting sidewise from the bracket 198. The edge 225 slopes upwardly away from the drum 171 so that when the floating pivot pin 209 approaches the drum 171, the finger 207 is lowered until it rests on the surface of a drum section or projects slightly into one of the openings 174, and when it moves away from the drum, it is lifted tilting upwardly on the pivot pin 209 against the action of a spring 227, one end of which is secured to a pin 228 on the lever arm 217 and the other end of which is secured to the plate 210. When all twelve grooves 173 have been filled or lined with the strip of paper, the finger 207 may be lifted away to release the paper by means of an arm 229 extending forwardly in position to be depressed by the operator. The roller 215 is retained against the edge of the cam 212 by means of a spring 230, secured at one end to a pin 231 and at its other end to a spoke 232 extending radially from the axis of the lever arm 217.

Just before the floating pin 209 moves to its maximum distance from the forming drum 171, and immediately before the finger 203 is in position to be depressed into one of the grooves 173, the proper depressing movement is transmitted from a cam 233 keyed on the shaft 176 and actuating a cam roller 234 carried on a lever arm 235 which is pivoted on the standard 168 and is pressed towards the cam 233 by means of a spring 236 coiled between a pin 237 on the lever 235 and a base 238 of the standards. The cam 233 has a circular cam edge or surface 239 throughout a large part of its periphery and a hump surface 240 projecting outwardly from the circular surface. As the projecting surface 240 passes under the roller 234, it swings the lever arm 235 outwardly away from the axis of the shaft 176 against the action of the spring 236.

This outward swinging movement of the lever 235 is transmitted to the lower arm of the lever 205 through a link 241 secured at its lower end to the lever 235, and at its upper end yieldingly secured to the lower end of the lever 205 by means of a hair pin spring 242 secured at one end to a pin 243 on the link 241, and at its other end to a pin 244 mounted on the end of the lever 205 and extending through a slot 245 in the link 241 to permit of a guided relative movement of the link relative to the lever.

Through the above cam 233, lever arm 235, link 241 and lever 205, a yielding downward movement is imparted to the finger 203. As the tip of the finger 203 contacts with the surface of the drum 171 before an opening 174 has reached its proper position under the finger, the further movement of the link 241 is taken up by the spring 242, and as soon as an opening 174 comes beneath the finger 203 the expansion of the spring 242 forces the finger into the opening. The action of the spring 242 may be reinforced by means of a leaf spring 246 secured to the upper surface of the lever 205 and bearing against the upper end of the link 241.

It will be noted that the hump or projecting portion 240 of the cam 233 is just in advance, radially, of the outwardly sloping portion 220 of cam 212 connecting the smaller circular surface 219 to the larger circular cam surface 218. Consequently, the finger 203 is depressed by the cam 233 onto the surface of the forming roller 171 before it is drawn forwardly by the cam 212 to a position to enter an opening 174, the movement of the link 241, after the finger 203 contacts with the surface of drum 171, being taken up in the springs 242 and 246. By thus causing the finger to contact first with the strip 27 and at about the mid portion of a length 31, and to then be drawn forwardly and drop into a groove 173, a sufficient length of paper is pushed forwardly between the fingers 203 and 207 to line one side of the groove 173 without drawing paper under the lower edge of finger 203. This avoids any danger of tearing the paper and insures an accurate positioning of the paper with the creases 28 and 29 at their proper positions in the openings 174.

As the drum 171 carries the mounted strip of paper through its movement of rotation, the outer surface of the paper covering the sections 175 is held in place by means of a cylindrical guiding mantel 247 mounted on the standards 167 and 168, and extending in a position slightly spaced from the surface of the drum to enable the paper strip 27 to lie therebetween. To insure an insertion of the forward edge of the strip beneath the mantel 247, the upper or entering edge of the mantel is turned outwardly at 248. A spring 249 is secured between a cylindrical section 250 of the guide plate 165 and the surface of drum 171 to press the strip 27 tightly against the drum as it leaves the rear edge of the guiding mantel 247.

It is to be noted also that the link 241 serves additionally as an anchorage for one end of the coiled spring 202, which is coiled about the hub of the bell crank lever 188 and secured at its other end to the arm 187 of the bell crank lever to hold the roller 186 firmly against the surface of the cam 183.

When a length of the strip 32, sufficient to line the outer surface and grooves or slots 22 of the armature 20 has been advanced and creased by the creasing mechanism and mounted on the drum 171, the clutch 80 will be disengaged by the disengaging mechanism 140—161, and both the creasing and mounting mechanism will stop. The creased and mounted portion of the strip is then severed from the following portion and slid into position on the armature 20.

For this purpose, an armature 20 is mounted on the shaft 172 to one side of the drum 171, and with its slots 22 aligned with the grooves 173 of the drum so that when the mounted strip of paper is pushed sidewise towards the armature, the lengths 31 in the grooves 173 will slip into place in the slots 22, and the lengths 30 will cover the peripheral segments 21. To guide the strip into its proper position on the armature, the grooves 173 are narrowed as at 252 at the side of the drum adjacent the armature to be lined.

The strip mounted on the drum 171 is pushed onto the armature 20 by means of a series of pusher rods 253, one for each of the grooves 173, positioned to slide through and to fill the outer portions of the grooves, the diameters of the rods being such as to prevent the paper from remaining between the edges of the rods and the inner surfaces of the grooves 173, and the narrowed portions 252 of the grooves 173 having those portions in the paths of the rods 253 of sufficient diameters that the rods may be pushed to the farther side of the drum 171 and completely displace the mounted strip of paper.

The rods 253 are manually pushed through suitably spaced guide openings 254 in the drum 171 with simultaneously and uniformly synchronized movements. For this purpose, the outer ends of the rods are mounted in a common collar 255 longitudinally slidable on a sleeve 256 encircling an extension of the shaft 172 and supported between the standard 168 and an outer standard 257. It will be understood that the collar 255 rotates with the drum 171, and during the mounting of the strip of paper 27 on the drum, is withdrawn to its farthest distance from the drum.

To slide the mounted strip of paper 27 onto the armature 20, the collar 255, and with it the rods 253, are pushed towards the drum by means of a manually operable forked lever 258 extending upwardly from a rock shaft 259 journaled in bearings 260 on the base. The upper end of the lever 258 is divided into a pair of arms 261 and 262 extending upwardly about the collar 255 to diametrically opposite points and provided with projections 263 and 264 extending into a peripheral groove 265 in the outer circumferential surface of the collar to permit the collar to rotate independently of the lever, but to be slid longitudinally thereby. One of the arms 261 is provided with a handle or arm 266 by which it is manually operable. The lever 258 may be returned manually, or upon the release of the handle 266 may be automatically returned by means of a spring 267, weight or equivalent means acting on an arm 268 secured to the rock shaft 259.

The mounted portion of the strip is severed from the following portion as it is pushed from the drum 171 onto the armature 20. For this purpose a knife blade 269 is mounted on a bracket 270 extending upwardly from the standard 167 to a position above the drum 171 at which the strip is to be severed, and at the edge of the drum which the armature abuts. A hump 271 is provided on the section 175 of the surface of the drum in alignment with the knife blade 269 to lift the strip against the knife blade as it is pushed off the drum.

When the mounted strip of paper is thus pushed onto the armature, the apparatus may be returned to its initial position to crease and mount a following strip of paper.

Through the above apparatus, therefore, an armature core 20 is wrapped in a continuous strip of paper and the paper is pressed into the grooves 22 of the core to line the inner surfaces of these grooves. When thus mounted on the core, the creases 28 and 29, engage the inner edges of the ledges 24 and 25 and prevent the inserted portions of the paper strip from being drawn out of the grooves.

As changes of construction could be made within the scope of my invention, it is desired that all matter contained in the above description or shown in the accompanying drawings shall be interpreted as illustrative and not in a limiting sense.

Having described my invention, what I claim and desire to secure by Letters Patent is:

1. Apparatus for lining armature cores with insulating material, which comprises a mounting drum having its surface divided into sections by circumferentially spaced radial grooves; means for creasing a strip of paper and mounting said strip on said drum with creases at opposite edges of said grooves and with successive lengths between creases alternately covering said surface sections and depressed into said grooves; and means for pushing said strip, thus mounted, sidewise onto an armature having grooves aligned with the grooves of said drum.

2. Apparatus for lining armature cores with insulating material, which comprises a mounting drum having its surface divided into sections by circumferentially spaced radial grooves; means for creasing a strip of paper; and means driven from said creasing means for mounting said strip on said drum with creases at opposite edges of said grooves and with successive lengths between creases alternately covering said surface sections and depressed into said grooves; and means for pushing said strip thus mounted on said drum sidewise onto an armature core having grooves aligned with the grooves of said drum.

3. Apparatus for lining armature cores with insulating material, which comprises a mounting drum having its surface divided into sections by circumferentially spaced radial grooves; means for creasing a strip of paper; means driven from said creasing means for mounting said strip on said drum with creases at opposite edges of said grooves and with successive lengths between creases alternately covering said surface sections and depressed into said grooves; means for pushing said strip thus mounted on said drum onto an armature core having grooves aligned with the grooves of said drum; driving means for said creasing and mounting means; and means actuated by said means to disengage said driving means upon the completion of a cycle of operations.

4. Apparatus for lining with insulation, armature cores having circumferentially spaced radial grooves which comprises a drum having grooves spaced to align with those of said armature core; means for facing the surface of said grooves of said drum with a continuous strip of insulating paper; and means for pushing said strip thus mounted on the drum sidewise from said drum onto an armature core aligned therewith.

5. Apparatus for lining with insulation armature cores having circumferentially spaced radial grooves which comprises a drum having grooves spaced to align with those of said armature core; means for facing the surface of said grooves of said drum with a continuous strip of insulating paper; means for pushing said strip thus mounted on said drum sidewise from said drum onto an armature core aligned therewith; and means for severing said strip from the remaining strip as it is pushed onto said core.

6. Apparatus for lining armature cores having circumferentially spaced radial grooves which comprises a drum having grooves spaced to align with those of said armature core; means for facing the surface of said grooves of said drum with a continuous strip of insulating paper; a series of pushing rods slidable longitudinally of the grooves of said drum to eject said strip therefrom; and means for synchronously and uniformly moving said rods.

7. Apparatus for lining armature cores having circumferentially spaced radial grooves which comprises a drum having grooves spaced to align with those of said armature core; means for facing the surface of said grooves of said drum with a continuous strip of insulating paper; and means for sliding said strip of paper longitudinally of said grooves.

8. Apparatus for lining armature cores having circumferentially spaced radial grooves which comprises a rotatable drum having grooves spaced to align with those of said armature core; means for rotating said drum intermittently to bring each groove in succession to a lining position; means for feeding a strip of paper onto said drum and pressing portions of said strip into said grooves as they reach a lining position; and means for pushing the portion of the strip thus mounted on the drum sidewise onto an armature core aligned therewith upon the completion of a rotation of the drum.

9. Apparatus for lining armature cores having circumferentially spaced radial grooves which comprises a rotatable drum having grooves spaced to align with those of said armature core; means for rotating said drum intermittently to bring each groove in succession to a lining position; means for feeding a strip of paper onto said drum and for pressing portions of said strip into said grooves as they reach a lining position; means for pushing the portion of the strip thus mounted on the drum sidewise onto an armature core aligned therewith upon the completion of a rotation of the drum; and means for severing the portion of said strip encircling said drum from the following portion as it is pushed from the drum.

10. Apparatus for lining armature cores having circumferentially spaced radial grooves which comprises a rotatable drum having grooves spaced to align with those of said armature core; means for rotating said drum intermittently to bring each groove in succession into a lining position; means for feeding a strip of paper onto said drum and for pushing portions of said strip into said grooves as they reach a lining position; a collar at one end of and rotatable with said drum and slidable axially; a series of spaced pusher rods projecting from said collar into the grooves of said drum; and means for pushing said collar towards said drum to push said rods longitudinally in the grooves of said drum.

11. Apparatus for lining grooved armature cores with insulation which comprises means for forming a series of spaced pairs of opposing creases in a strip of paper; a mounting drum having its peripheral surface divided into sections by circumferentially spaced radial grooves adapted to align with those of said armature core; means for mounting the portions of said paper strip between the creases of each pair on the sections of said drum; means for pushing the lengths of said strip between said pairs into said grooves; and means for pushing said mounted strip portion onto an armature core aligned with said drum.

12. Apparatus for lining grooved armature cores wtih insulation which comprises means for forming a series of spaced pairs of opposed creases in a strip of paper; a rotatable mounting drum having its peripheral surface divided into sections by circumferentially spaced radial grooves adapted to align with those of said armature core; means for intermittently rotating said drum to bring each surface section and groove into position to receive said strip of paper with the portion of said strip between the creases of each pair lying on the surface sections of said drum; and means for pushing the portions of said strip between successive pairs into said grooves.

13. Apparatus for lining grooved armature cores with insulation which comprises means for forming a series of spaced pairs of opposed creases in a strip of paper; a rotatable mounting drum having its peripheral surface divided into sections by circumferentially spaced radial grooves adapted to align with those of said armature core; means for intermittently rotating said drum to bring each surface section and groove into position to receive said strip of paper with the portion of said strip between the creases of each pair on the surface sections of said drum; means for pushing the portions of said strip between the creases of successive pairs into said grooves; and means for pushing said strip sidewise onto an armature core aligned with said drum.

14. Apparatus for lining grooved armature cores with insulation which comprises means for forming a series of spaced pairs of opposed creases in a strip of paper; a rotatable drum having its peripheral surface divided into sections by circumferentially spaced radial grooves adapted to align with those of said armature core; means for intermittently rotating said drum to bring each surface section and groove into position to receive said strip of paper with the portion of said strip between the creases of each pair onto the surface sections of said drum; means for pushing the portions of said strip between the creases of successive pairs into said grooves; means for pushing said strip sidewise into an armature core aligned with said drum upon the completion of a rotation of said drum; and means for severing the portion of said strip on said drum from the remaining portion as said strip is pushed from said drum.

15. Apparatus for facing a grooved armature core with insulation which comprises a drum having grooves to align with those of said armature; means for mounting a transversely creased strip of paper on said drum with a crease at the edge of a groove; a pair of fingers; and means for operating said fingers to hold said paper strip at the edge of a groove with one finger and to engage a length of paper and draw it to and push it into said groove with the other finger.

16. Apparatus for facing a grooved armature core with insulation which comprises a drum having grooves to align with those of said armature; means for mounting a transversely creased strip of paper on said drum with a crease at the edge of a groove; a pair of fingers; and means for operating said fingers to hold said paper strip at the edge of a groove with one finger and to engage a length of paper with the other finger and draw it to and push it into said groove, and to withdraw said holding finger from said groove as said drawing finger reaches it.

17. Apparatus for facing grooved armature cores with insulation which comprises a drum having circumferentially spaced radial grooves to align with those of said core; means for rotating said drum at intervals to advance said drum the distance between adjacent grooves; means for feeding a strip of insulating paper to said drum; and mechanism comprising a pair of fingers operated to gather a length of strip being fed to said drum, draw it forwardly to a groove, and push it into said groove during a period of rest of said drum.

18. Apparatus for lining grooved armature cores with insulation which comprises a drum having circumferentially spaced radial grooves to align with those of said core; means for rotating said drum at intervals to successively advance each successive groove to a mounting position; means for feeding a strip of transversely creased paper to said drum at said mounting position with a crease at the edge of said groove; a pair of fingers; and means for operating said fingers to engage said strip at said groove with one finger, to engage said strip between said crease and a following crease with the other finger, draw said latter finger to said groove, withdraw the holding finger, and push the drawing finger into said groove.

19. Apparatus for lining grooved armature cores with insulation which comprises means for supplying a transversely creased strip of paper; a rotatable drum having circumferentially spaced radial grooves to align with those of said armature core; a drive shaft; means for intermittently driving said drum from said drive shaft to bring each groove in succession into position with the edge of a groove under a crease of said strip; a pair of fingers; a pair of cams on said drive shaft; and mechanism for operating said fingers from said cams to grasp a length of said strip between the edge of a groove and a following crease in said strip and thrust it into said groove.

20. Apparatus of the type described which comprises a rotatable drum having circumferentially spaced longitudinally extending grooves projecting radially inwardly; a drive shaft; means for intermittently rotating said drum from said shaft a distance equal to the space between said grooves; a pair of cams on said drive shaft; a floating pivot pin driven by one of said cams; a pair of fingers; and means actuated by said cams through said floating pin to hold one finger at the opening of a groove, to draw the other finger to said groove, withdraw the held finger from the groove and drive the approaching finger thereinto.

21. Apparatus of the type described which comprises a rotatable drum having circumferentially spaced radial grooves; a drive shaft; a dog for holding said drum from movement; means driven from said shaft for lifting said dog and intermittently rotating said drum a distance equal to the space between adjacent grooves; a pair of cams on said drive shaft; a floating pivot pin driven by one of said cams; a pair of fingers; and means actuated by said cams through said floating pin to hold one finger to said groove, draw the other finger forwardly to said groove, withdraw the held finger and drive the drawn finger into said groove.

22. Apparatus of the type described which comprises a rotatable drum having circumferentially spaced radial grooves; a drive shaft; means actuated from said shaft for intermittently driving said drum through an angle equal to the angle between adjacent grooves; a pair of cams on said drive shaft; a lever driven by one cam and carrying a floating pivot pin; a holding finger actuated by said pin to engage a groove opening at intervals and to withdraw therefrom; and a finger actuated by the other cam to approach said groove and holding finger when the latter is at the groove and to plunge it into the groove as the holding finger is withdrawn.

23. Apparatus of the type described which comprises a pair of vanes rotatable in succession on a common axis; a rotatable folding bar; means for rotating each vane in succession in a single direction from a position on one side of said folding bar to a position on the other side thereof so that said bar is engaged on opposite sides simultaneously by said vanes; means for rotating said bar out of said engaging position during said rotations of said vanes; and means for passing a strip of paper between said vanes and said bar.

24. Apparatus of the type described which comprises a folding bar; a pair of forming vanes rotatable about a common axis; means for holding one vane on one side of said folding bar and the other on the other side thereof and for simultaneously rotating said folding bar into and out of position and rotating said forming vanes in an unidirectional movement each to the position occupied by the other and at opposite sides of said folding bar; and means for advancing a strip of paper between said bar and said pair of vanes with each cycle of operation.

25. Apparatus of the type described which comprises a folding bar; a pair of forming vanes rotatable about a common axis; means for holding one vane on one side of said folding bar and the other on the other side thereof and for simultaneously rotating said folding bar into and out of position and rotating said forming vanes in unidirectional movement each to the position occupied by the other and to opposite sides of said folding bar; means for advancing a strip of paper between said bar and said pair of vanes with each cycle of operations; a common drive means for said mechanism; and means for disengaging said drive upon the completion of a definite cycle of folding operations.

26. Apparatus of the type described which comprises an eccentrically mounted rotatable folding bar; a pair of vanes mounted on a common axis to abut either face of said folding bar when said folding bar is in one position of rotation; a common drive shaft for said mechanisms; gears driven from said drive shaft to rotate one vane from one face of said folding bar through nearly a revolution to the other face; gearing driven simultaneously from said drive shaft to advance the other vane through the space occupied by said folding bar and to stop at the opposite side thereof; means for simultaneously rotating said folding bar on its eccentric mounting to permit said vane to pass; and means for advancing a strip of paper between said vanes and folding bar.

27. In a device for lining armature cores having exterior surfaces of irregular contour; an armature supporting means; means for lining the irregular surfaces of said armature with a portion of a continuous strip of insulating material.

28. In a device for lining armature cores having a plurality of circumferentially spaced radial grooves; means for forming a strip of material to substantially the contour of the exterior surface of the armature; and means for mounting the formed strip on said armature core.

29. In a device for lining an armature core having its surfaces divided into sections by circumferentially spaced radial grooves; means for creasing a strip of insulating material; means including a drum for forming said strip to substantially the contour of the surface of said armature and means for mounting the formed strip on said armature.

30. In a device for lining armature cores having exterior surfaces of irregular contour; an armature supporting means; means for creasing a strip of insulating material and means for facing the irregular surfaces of said armature with the creased strip of material.

31. In a device for lining armature cores with a continuous strip of insulating material comprising in combination a core holder; means for introducing a loop of insulating material into a core slot; and means for severing said strip.

32. In a device for lining armature cores with a continuous strip of fibrous material comprising in combination a core holder; means for forming a loop from said strip; means for introducing said loop of insulating material into a core slot; and means for severing said continuous strip of insulating material.

33. In a device for lining the grooves of armature cores comprising an armature supporting means; means for forming a strip of insulating material to predetermined configuration; and means for inserting said formed strip in a groove of an armature core.

In testimony whereof, I affix my signature.

HARRISON H. EATON.